US008005766B2

(12) United States Patent
Tian et al.

(10) Patent No.: US 8,005,766 B2
(45) Date of Patent: Aug. 23, 2011

(54) APPARATUS, METHOD AND COMPUTER PROGRAM PRODUCT PROVIDING A HIERARCHICAL APPROACH TO COMMAND-CONTROL TASKS USING A BRAIN-COMPUTER INTERFACE

(75) Inventors: Jilei Tian, Tampere (FI); Teemu Ahmaniemi, Helsinki (FI); Péter Boda, Helsinki (FI); Ákos Vétek, Helsinki (FI)

(73) Assignee: Nokia Corporation, Espoo (FI)

( * ) Notice: Subject to any disclaimer, the term of this patent is extended or adjusted under 35 U.S.C. 154(b) by 931 days.

(21) Appl. No.: 11/787,906

(22) Filed: Apr. 17, 2007

(65) Prior Publication Data

US 2008/0235164 A1 Sep. 25, 2008

Related U.S. Application Data

(60) Provisional application No. 60/919,573, filed on Mar. 23, 2007.

(51) Int. Cl.
*G06F 17/00* (2006.01)
*G06F 17/20* (2006.01)
*G09B 21/00* (2006.01)
*H01H 67/00* (2006.01)
*H04B 1/38* (2006.01)
*A61B 5/04* (2006.01)

(52) U.S. Cl. .......... 706/11; 340/4.1; 340/2.81; 455/564; 600/545; 706/909

(58) Field of Classification Search .................... 706/11, 706/52, 909, 924; 600/544–545; 340/825.02, 340/825.19, 2.81, 4.1; 455/564
See application file for complete search history.

(56) References Cited

U.S. PATENT DOCUMENTS

| 5,638,826 | A | * | 6/1997 | Wolpaw et al. | 340/825.19 |
| 5,933,599 | A | * | 8/1999 | Nolan | 715/734 |
| 2002/0077086 | A1 | * | 6/2002 | Tuomela et al. | 455/414 |
| 2002/0077534 | A1 | * | 6/2002 | DuRousseau | 600/544 |
| 2002/0126153 | A1 | * | 9/2002 | Withers et al. | 345/773 |
| 2005/0256817 | A1 | * | 11/2005 | Wren et al. | 706/45 |

OTHER PUBLICATIONS

Du,W. et al. "Building decision tree classifier on private data", Proceedings of the IEEE international conference on Privacy, security and data mining—vol. 14, 2002.*
Panuccio,A. et al. "A Hidden Markov Model-Based Approach to Sequential Data Clustering", SSPR&SPR 2002, LNCS 2396, pp. 734-743, Springer-Verlag, 2002.*
Joshi,A.J. "Mining Biomedical Signals: First Progress Report" Indian Institute of Technology, Bombay, Mumbai, Aug. 31, 2004.*

(Continued)

*Primary Examiner* — Jeffrey A Gaffin
*Assistant Examiner* — Benjamin Buss
(74) *Attorney, Agent, or Firm* — Harrington & Smith

(57) ABSTRACT

Disclosed is a method, a computer program product, and a device that are responsive to detected mental states of a user to perform selection processes to execute a task. The method includes providing a hierarchical multi-level decision tree structure comprised of internal nodes and leaf nodes, where the decision tree structure represents a task. The method further includes navigating, using information derived from detected mental states of the user, through levels of the decision tree structure to reach a leaf node to accomplish the task. The step of navigating includes selecting, using the information derived from the detected mental states of the user, between attribute values associated with internal nodes of the decision tree structure. As non-limiting examples, the device may be a communication device, and the task may be a name dialing or a command/control task.

40 Claims, 3 Drawing Sheets

OTHER PUBLICATIONS

Zhong,S. et al. "HMMs and Coupled HMMs for Multi-channel EEG Classification", Proc. IEEE Int. Joint Conf. Neural Networks, 2002.*

Mimer,B. et al. "Flexible Deciscion Trees for Grapheme Based Speech Recognition", 2004.*

Tian,J. et al. "Weighted entropy training for the decision tree based text-to-phoneme mapping", Eurospeech 2003—Interspeech 2003, 8th European Conference on Speech Communication and Technology, pp. 217-220. 2003.*

Quinlan, J., "C4.5 Programs for Machine Learning", Morgan Kaufmann Publishers Inc., San Mateo, CA, pp. 17-26 and 35-43, 1993.

* cited by examiner

APPARATUS, METHOD AND COMPUTER PROGRAM PRODUCT PROVIDING A HIERARCHICAL APPROACH TO COMMAND-CONTROL TASKS USING A BRAIN-COMPUTER INTERFACE

CLAIM OF PRIORITY FROM COPENDING PROVISIONAL PATENT APPLICATION

This patent application claims priority under 35 U.S.C. §119(e) from Provisional Patent Application No. 60/919,573, filed Mar. 23, 2007, the disclosure of which is incorporated by reference herein in its entirety.

TECHNICAL FIELD

The exemplary and non-limiting embodiments of this invention relate generally to wireless communication systems, methods, devices and computer program products and, more specifically, relate to techniques to control operation of a device, or an application or task performed by the device.

BACKGROUND

A brain-computer interface (BCI) is a system which is intended to permit a user to control an application/device by using only his or her thoughts (more specifically, using neurophysiological signals detected from the brain or from other nervous tissue). BCI systems are typically based on an electroencephalography (EEG) recorded from the scalp. The EEG is measured and sampled while the user imagines different things (for example, moving the left hand or the right hand). Depending on the BCI, particular preprocessing and feature extraction methods are applied to an EEG sample of a certain length, with goal being to reliably detect the limited mind states from the EEG signals or patterns from the EEG samples with a certain level of accuracy.

A problem that arises, based at least in part on the limited understanding of the human brain and its inherent electrical activities, is that the accuracy of mind state detection is degraded as the number of mind states is increased. For example, at present it is not possible to recognize words that a user may think of (as might be desirable in order to implement a dictation task). However, the current state of the art does generally permit a few emotional states and/or motor intentions to be reliably detected, such as relaxed vs. stressed modes, moving the right hand, moving the left hand, and so forth.

The problem of constructing a reliable BCI has received considerable attention in recent years. Using EEG signals as a non-invasive method has been demonstrated to be a feasible approach in BCI. However, and as was noted above, due to the limited understanding of human brain and its electrical activities only a limited number of brain or mind states, driven by either physical or imagined actions, can be reliably detected, such as wake/sleep modes, motor-related EEG changes, and emotional states to some degree.

Previous studies have focused on applying EEG signals to simple command control tasks, for example moving a cursor on a computer screen or controlling movement of a robot or robot manipulator. This type of command-control has been implemented in a linear manner, i.e., the BCI control is structured to detect a subject's mind state from an EEG and to convert the detected mind state into a corresponding command. As can be appreciated, this type of simple linear control can become problematic when dealing with more complex tasks.

SUMMARY OF THE EXEMPLARY EMBODIMENTS

The foregoing and other problems are overcome, and other advantages are realized, in accordance with the non-limiting and exemplary embodiments of this invention.

In accordance with a first aspect thereof the exemplary embodiments of this invention provide a method that comprises providing a hierarchical multi-level decision tree structure comprised of internal nodes and leaf nodes, the decision tree structure representing a task; and navigating, using information derived from detected mental states of a user, through levels of the decision tree structure to reach a leaf node to accomplish the task.

In accordance with a further aspect thereof the exemplary embodiments of this invention provide a computer program product embodied in a tangible memory medium and that comprises program instructions that when executed by a data processor result in operations that comprise providing a hierarchical multi-level decision tree structure comprised of internal nodes and leaf nodes, the decision tree structure representing a task; and navigating, using information derived from detected mental states of a user, through levels of the decision tree structure to reach a leaf node to accomplish the task.

In accordance with another aspect thereof the exemplary embodiments of this invention provide a device that comprises a data processor configured to provide a hierarchical multi-level decision tree structure comprised of internal nodes and leaf nodes, the decision tree structure representing a task; and a user interface configured to use information derived from detected mental states of a user to enable the user to navigate through levels of the decision tree structure to reach a leaf node to accomplish the task.

In accordance with yet another aspect thereof the exemplary embodiments of this invention provide an apparatus that comprises means for providing a representation of a hierarchical multi-level decision tree structure comprised of internal nodes and leaf nodes, the decision tree structure representing a task; and means responsive to information derived from detected mental states of a user for enabling the user to traverse the decision tree structure to reach a leaf node to accomplish the task.

In accordance with still another aspect thereof the exemplary embodiments of this invention provide a method that includes displaying to a user at least a portion of a multi-level, level, multi-node structure that represents an application dialogue; detecting mental states of the user to navigate the structure to reach a desired level and node and, in response to the user generating a particular mental state, performing an application task using information associated with the desired node.

BRIEF DESCRIPTION OF THE DRAWINGS

The foregoing and other aspects of the teachings of this invention are made more evident in the following Detailed Description, when read in conjunction with the attached Drawing Figures, wherein.

DETAILED DESCRIPTION

The exemplary embodiments of this invention provide an ability to control complex tasks using limited mind states. By a 'task' what is generally implied is an application where a selection is to be made either through a menu structure or from a list (e.g., selecting a name from a phonebook to make a phone call). The use of the exemplary embodiments of this invention provide an ability to reconcile the contradiction between the increased number of commands that must be controlled in more complex tasks and the limited number of mind states that are currently capable of being reliably detected. The exemplary embodiments of this invention address and solve the problem of how to control a complex task, such as name dialing in a communication device, given the limited number of discrete mind states that can be decoded from an observable EEG or similar type of signal.

Figure 1:
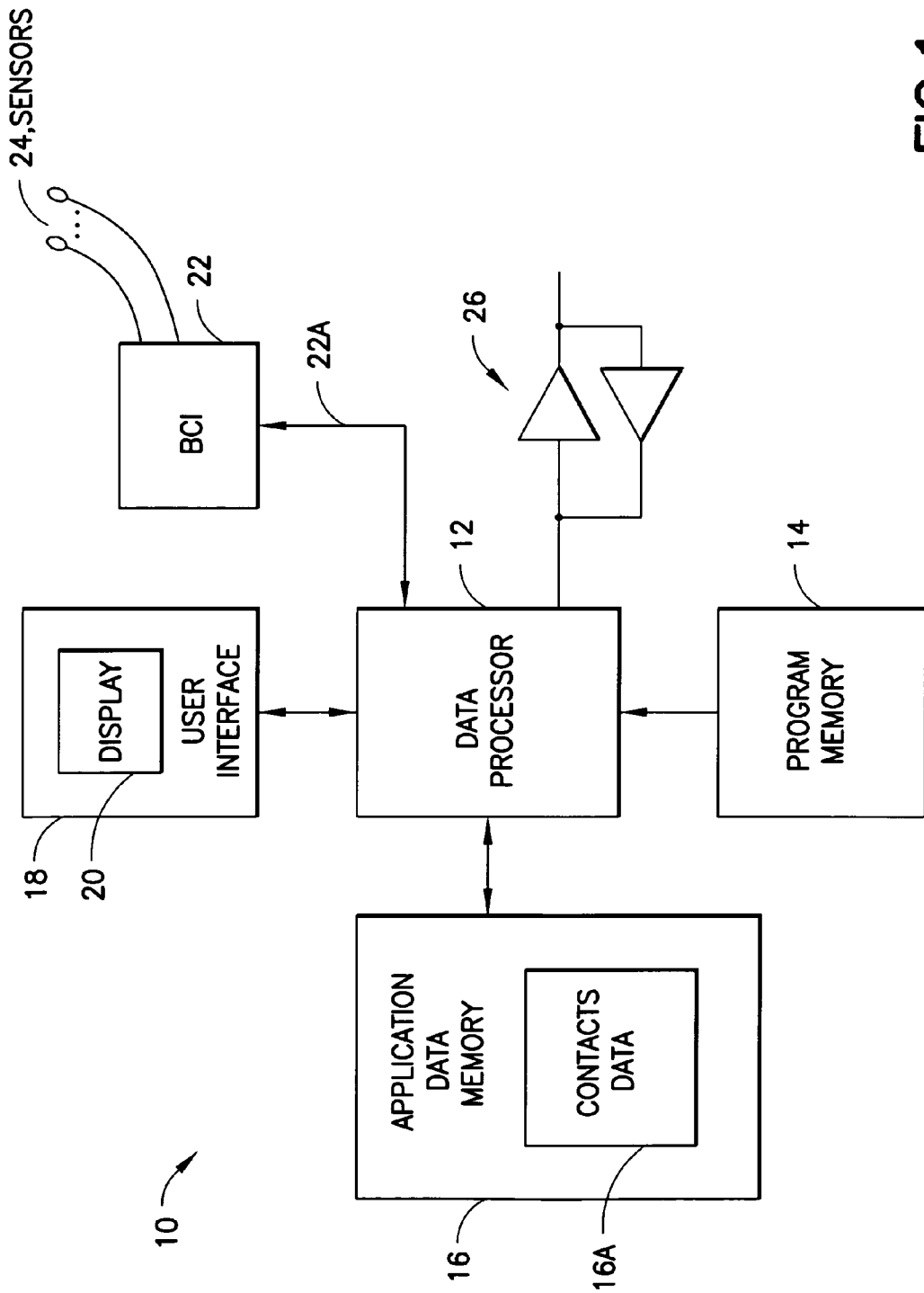
FIG. 1 is a simplified block diagram of a device, such as a communications device, that is constructed and operated in accordance with the exemplary embodiments of this invention.

Reference is made first to FIG. 1 for illustrating a simplified block diagram of a non-limiting embodiment of a electronic device 10 that is suitable for use in practicing the exemplary embodiments of this invention. The device 10 is assumed to include a data processor (DP) 12 coupled with a program memory 14 that contains executable program instructions and is further coupled with an application data memory 16 containing, as one non-limiting example, contacts data 16A (e.g., a phone book listing of names and associated phone numbers, email addresses, and the like). In some embodiments the program memory 14 and the applications data memory 16 may be contained in one memory device. The device 10 also includes a user interface 18 that includes some type of visual display 20 (e.g., a CRT, LCD, or plasma type of display, which may or may not be touch sensitive). For the purposes of describing this invention the device 10 further includes, or is coupled with, a BCI 22 having, in one non-limiting example, EEG or similar types of electrodes (sensors) 24. Note that the sensors 24 may be contact-type sensors or possibly non-contact type sensors. The output 22A of the BCI 22 is data expressive of detected electrical signals (an EEG) obtained from a subject (also referred to herein as a user) via the sensors 24. For completeness, the device 10 may also include some type of suitable transceiver 26 (e.g., an electrical signal transceiver, a radio frequency signal transceiver, an optical signal transceiver) for enabling communication to occur, such as a telephone call and/or data network access (e.g., Internet access).

The BCI 22 is shown bidirectionally coupled with the data processor 12 as some training procedure is typically required between the user and the BCI 22. This training can take any suitable form, such as by displaying information on the display 20 and then interacting with the BCI 22 while the user generates mental states for selecting and/or navigating through the information. A more conventional user interface (e.g., a touch screen or keyboard/keypad) may be used during training to indicate correct and incorrect results to the BCI 22 for tuning the response of the BCI 22 to the user's mental states when presented with training information.

It should be noted that the BCI 22 may not form a part of the device 10 and may not be co-located with the device 10. For example, the BCI 22 and sensors 24 may be embodied in a separate unit that is worn by the user, and in this case the output 22A may be comprised of wires for making a direct electrical interface to the device 10, or the output 22A may be a wireless interface with the device 10, such as a low power RF or optical interface (e.g., a Bluetooth™ interface).

It should be noted that the details of the construction and operation of the BCI 22, as well as the operation of and/or type of sensors 24, are not particularly relevant to this invention, so long as the BCI 22 is capable of providing at output 22A reliable indications to the data processor 12 of various mental states generated by the user.

That is, and in general, the BCI 22 may be embodied in any type of currently available or future technology that is capable of detecting mental activity/states of the user, and also providing information that distinguishes one detected mental activity/state from another. The use of the BCI 22/sensors 24 that detect and interpret EEG signals is thus but one non-limiting and exemplary embodiment. However, it should be noted that in some embodiments of this invention the BCI interface 22A may convey simply the raw or preprocessed mental state data (e.g., EEG data), and the processing of this data may occur within the device 10, such as by the data processor 12 or another data processor, to provide the indications of various mental states generated by the user.

The data processor 12, in response to the information received from the output 22A, operates under control of one or more programs stored in the program memory 14 for performing a task or tasks in accordance with the exemplary embodiments of this invention, as described further below. In general, the exemplary embodiments of this invention may be implemented by computer software executable by the data processor 12, or by hardware, or by a combination of software, firmware and hardware.

The various embodiments of the device 10 can include, but are not limited to, cellular phones, personal digital assistants (PDAs) having communication capabilities, portable computers having communication capabilities, image capture devices such as digital cameras having communication capabilities, gaming devices having communication capabilities, music storage and playback appliances having communication capabilities, Internet appliances permitting Internet access and browsing, as well as portable units or terminals that incorporate combinations of such functions.

Note that the use of the exemplary embodiments of this invention does not require that communication capabilities be present. For example, and as will be described below, the use of the exemplary embodiments enables the implementation of a device control functionality, such as in a camera or a music appliance, that does not require an ability to communicate external to the device 10.

The memories 14, 16 may be of any type suitable to the local technical environment and may be implemented using any suitable data storage technology, such as semiconductor-based memory devices, flash memory, magnetic memory devices and systems, optical memory devices and systems, fixed memory and removable memory. The data processor 12 may be of any type suitable to the local technical environment, and may include one or more of general purpose computers, special purpose computers, microprocessors, digital signal processors (DSPs) and processors based on a multi-core processor architecture, as non-limiting examples.

The exemplary embodiments of this invention provide a hierarchical selection methodology based on the use of the BCI 22. Due at least in part to the current technical limitations in classifying the electrical signals of the brain (EEG), control selection steps are divided into stages, such as in a hierarchical tree-type structure. At each stage there are only a limited number of options (selections) available, enabling the use of a rather simple BCI-based EEG classification to navigate through the option space. This type of decision tree approach can be used to advantage for, as a non-limiting example, telephone number dialing based on names in a mobile communication device 10.

A decision tree is a tree in which each internal node represents a choice between a number of alternatives, and each leaf node represents a classification or command control. As an example, people often associate another person with their attributes. For instance, a former colleague can be easily described as follows: colleague, male, lives in Helsinki, Chinese, works in speech recognition. Although one may readily recall the colleague's name, an associative technique of remembering the colleague's identity will resolve any ambiguity. This type of associative process can be implemented in accordance with the exemplary embodiments of this invention.

As was noted previously, the use of BCI has been studied and applied to send messages to and control commands in the external world. Among others, the EEG-like signal is commonly used to decode the mind states in a control task. Encouraged by new understanding of brain function, coupled with the development of powerful low-cost computing chips and pattern recognition techniques, EEG-driven BCI is becoming feasible as an augmentive user interface.

In accordance with the exemplary embodiments of this invention the BCI 22 allows a user to control the device 10 without using the brain's normal output pathways of peripheral nerves and muscles. The commands need not be expressed by muscle contractions, but rather by the EEG (or some other) signal originating in the brain. Improved performance is achieved using only the limited mind states decoded from EEG signals.

In a conventional sense the accuracy of the mind state classification is dramatically decreased when the number of mind states is increased, thus making it difficult to apply BCI to complex control tasks, e.g., name dialing. The exemplary embodiments of this invention provide an approach to solve this and other problems.

Described now is a non-limiting case of a hierarchically structured decision tree-based classification for use with the BCI 22. For simplicity the EEG signal is used in the context of a name dialing task, although it should be realized the EEG can be extended to other brain-related biological signals, and the application of same can be made to a number of other command control tasks besides name dialing.

Figure 2:
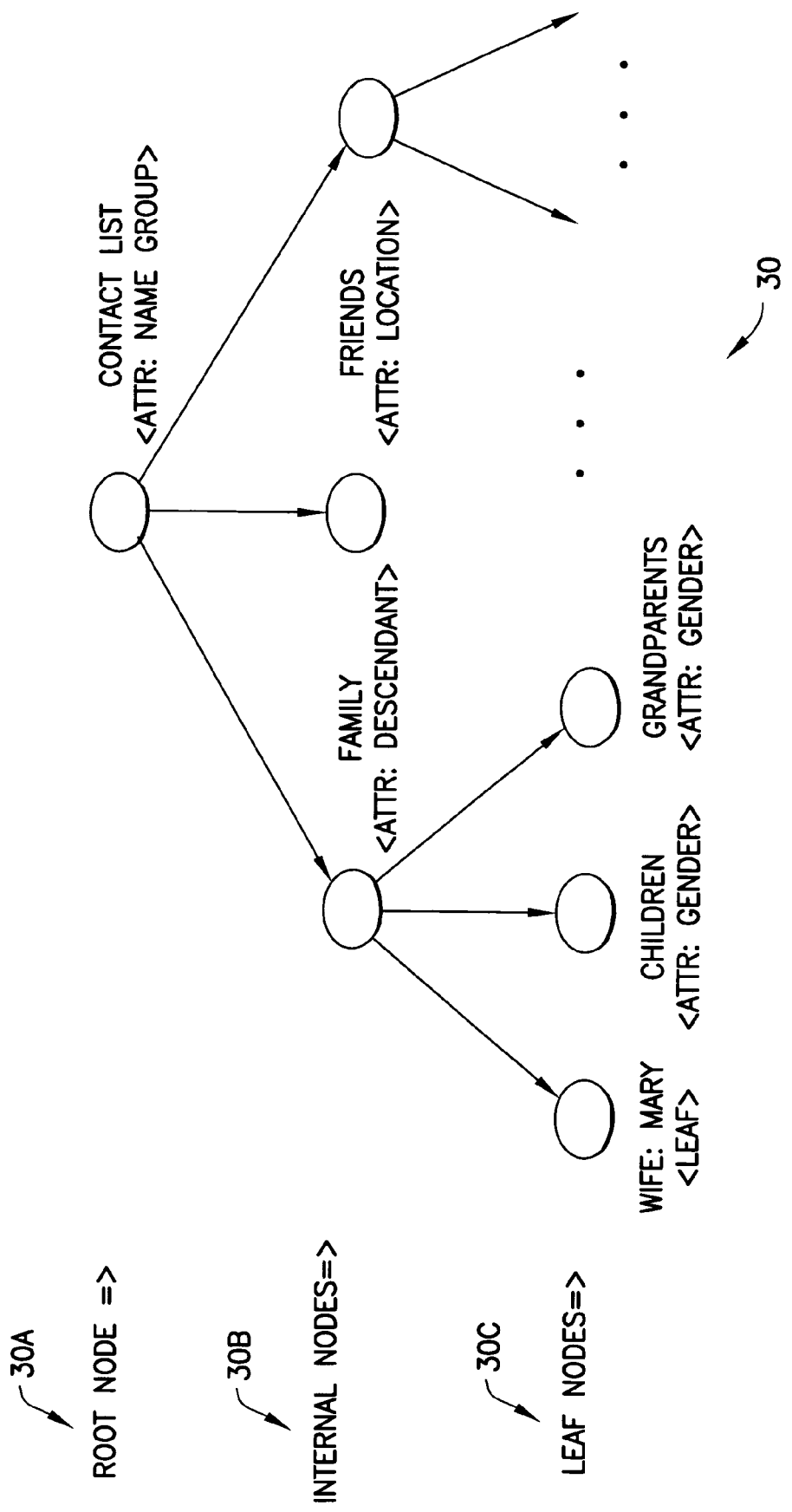
FIG. 2 shows an exemplary decision tree structure for representing a name dialing task.

The name dialing task may be represented using the decision tree structure 30 shown in FIG. 2. In this exemplary embodiment there is a root node 30A, designated as a Contact list with an attribute: name group. The root node is further split into at least one internal node 30B, and each internal node corresponds to one of the answer or value of the root node attribute. For example, the root node has attribute <attribute: name group>. Its values are {Family, Friends, . . . }. The internal nodes are designated Family with an <attribute: descendant>, and Friends with <attribute: location>. Finally there are leaf nodes 30C, such as one shown under internal node Family, specifically wife. Also under internal node Family are further, possibly internal nodes (depending on the user's circumstances) such as Children and Grandparents, each having an <attribute: gender>. There can thus be more than one level of internal nodes 30B. The overall decision tree structure 30 may be considered to represent a hierarchy of persons (and/or non-person entities, such as businesses), and may thus be considered to be a hierarchical tree structure.

The decision tree 30 is used for the BCI 22 command-control task, where the contact or name list is decomposed as a decision tree having the root node 30A, the internal nodes 30B and the leaf nodes 30C. In the internal nodes 30B the attribute and the attribute value are stored. In a leaf node 30C a decoded command or name is stored (e.g., the leaf node may contain or point to a telephone number to be dialed, or an email address, or some other type of contact-related information). The decision tree search/climb is terminated at the leaf node.

In the decision tree 30 the attribute specifies what kind of context information is considered for modeling the commands/names in the node. The possible choices depend on the specific task. In the non-limiting case of name dialing, the contextual attribute may be a categorical group with value, such as family, colleagues, friends, business partners; gender with the binary values of male and female; location with a value of a city, business units of a company, and so forth. All of the attributes and their values are preferably predefined. Since the decision tree 30 is branched depending on the number of attribute values it is preferred to keep the discrete possible attribute values within a relatively small range so as to manage complexity. The command or name is selected from a leaf node 30C given the context.

The attributes in the internal nodes 30B may be trained based on certain criterion (e.g., entropy-based information gain criterion), so that it becomes possible to maximize the performance of a pattern classification task. In general, decision trees are known to be a very efficient way to utilize context information. The most relevant context information is found by splitting the task/data set in such a way, for example, that entropy is minimized. To even further improve performance it is desirable that the user have control over signal features, and that the BCI 22 correctly derive the user's mind state from EEG. On the other hand, the user is expected to maintain a close correlation between the decoded mind states and the signal features to facilitate the task of the BCI 22 decoding the signal features into correct commands that accomplish the user's intentions. The training of the decision tree 30 is beneficial to adapt the user and the BCI 22 to one another initially and continuously so as to ensure improved performance. In this approach the user concentrates on different mental tasks, for example, changing emotional states or sleeping mode, imagining moving the hand, etc. Concentration on these mental tasks produces different mind states decoded from the EEG signal by the BCI 22. The decision tree 30 is trained with the features extracted from EEG signal containing the different mental tasks. An additional classifier before the decision tree 30 can also be trained to classify the mind states from EEG features.

In training, the root node 30A of the decision tree 30 is split first. In order to split the root node 30A into child nodes, an attribute is selected. Then different attributes are tested and the one that maximizes the information gain is chosen for splitting the root node 30A. In order to compute the information gain, the data distribution before splitting the root node should be known. Based on the data distribution in the root node, the entropy is computed according to $$E = -\sum_{i=1}^{N} f_i \cdot \log_2 f_i,$$

where N is the number of data, and $f_i$ is the relative frequency of occurrence (probability) for the $i^{th}$ data. Based on the predefined contexts the training cases in the root node 30A are split into subsets according to the possible attributes. For a given attribute, the entropy after the split is computed as the average entropy of the entropies of the subsets. The information gain is computed as the change between root entropy and the average entropy after the split for each attribute, and the attribute that has the highest information gain is selected as the root attribute. The splitting of the nodes in the decision tree 30 is repeated for the child nodes (internal nodes) of the root node 30A. The training cases belonging to each child node are further split into subsets according to the different attributes. For each child node, the attribute that has the highest information gain is selected. The splitting of the nodes in the decision tree 30 continues until some stopping criterion is met. General reference with regard to such a training procedure can be made to, for example: Quinlan, J., C4.5. *Programs for Machine Learning*. Morgan Kaufmann Publishers Inc., San Mateo, Calif., 1993.

During the training and use of the decision tree 30 a representation of same can be displayed to the user on the display 20.

In operation, when the user traverses (i.e., navigates) the decision tree 30 to the leaf node wife: Mary, the phone number can be automatically retrieved from the contacts data 16A by a dialer application software stored in the memory 14, and the number dialed. For the case of the non-terminated internal node, a further selection is made if the user has at least two children of different genders before arriving at a desired leaf node where the associated phone number can be dialed.

As a further example, consider the internal node 30B Friends, where the <attribute: location> may be sub-divided as in-town and out-of-town, where selection of out-of town leads to a further internal node having attributes: in-country and out-of-the-country, and so forth.

Based on the foregoing it should be appreciated that the exemplary embodiments of this invention provide an ability for mind states to be used reliably in a classification process since a complex task, e.g., name dialing, is processed hierarchically. Thus, at each layer of the decision tree 30 as the user navigates through the decision tree 30 there are only a limited number of states (i.e., attribute values) for the user to select between by generating one of a limited number of mind states. Further, the attributes in the internal nodes 30B may be trained based on certain criterion (e.g., the entropy based information gain criterion). In addition, the training of the decision tree 30 enables mutual adaptation of the user and the BCI 22 both initially and continuously.

For the exemplary case of name dialing, the decoded mind states output from the BCI 22 control the attributes, rather than the names. By decomposing the control/selection process (the name recognition process in this example) into an attribute recognition process, reliable control and selection can be achieved with the use of a limited set of user mind states, which can be recognized and applied efficiently and accurately.

The implementation of the exemplary embodiments of this invention can be varied in many ways. One exemplary embodiment is to provide BCI-based control over the basic functions of the device 10, such as a mobile communication device.

As another non-limiting example, the exemplary embodiments of this invention could be used in a music playback device 10 to navigate through a music selection menu where nodes have attributes such as: classical/contemporary, and where selection of the classical attribute may lead to an internal node having attributes such as: baroque/19th century, and so forth, until a leaf node 30C is reached that stores or points to a particular title to be played.

As should be apparent, one non-limiting advantage that is gained by the use of the exemplary embodiments of this invention is that a complex task (e.g., name dialing) is processed hierarchically and decomposed into a plurality of small tasks at each internal node 30B that can be reliably controlled by decoded mind states received from the BCI 22. Thus, performance and accuracy of the BCI-based process are improved.

Another advantage that is gained by the use of the exemplary embodiments of this invention is that, instead of controlling commands directly, attributes are employed as auxiliary commands that are executed in the accomplishment of the overall control task that is achieved by the user navigating through the decision tree 30 level by level.

Additional advantages that are gained by the use of the exemplary embodiments of this invention include, but are not limited to: ease of use (natural, intuitive, direct, hands-free, effortless in the physical sense, well suited for persons having certain disabilities); functional flexibility enabling control to be achieved when hands, eyes, or voice are impaired or busy; and a new/alternative user interface paradigm is provided for mobile devices, in particular for mobile devices having a physically constrained UI. In addition, further personalization (and security) of a mobile device 10 is achieved, as at least certain control features of the device are intimately linked to the particular user of the device.

Figure 3:
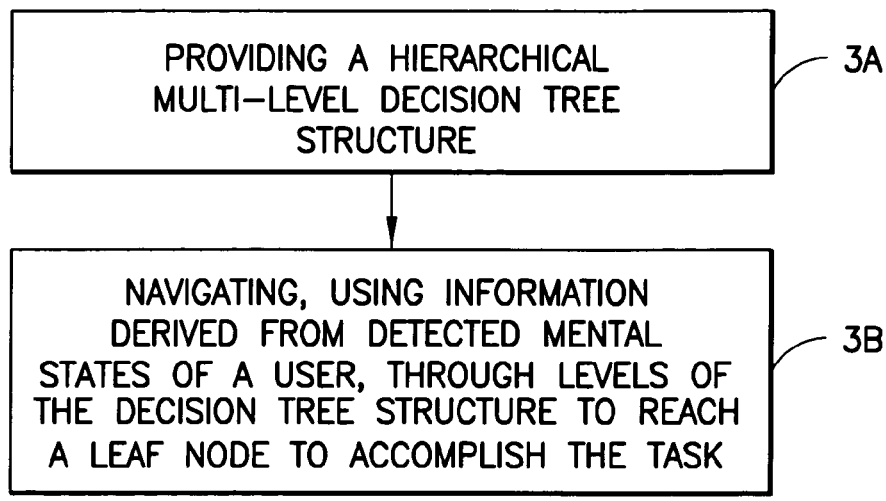
FIG. 3 is a logic flow diagram in accordance with a method, and the operation of a computer program product, in accordance with exemplary embodiments of this invention.

Referring to FIG. 3, in accordance with a method, and the operation of a computer program product, the exemplary embodiments of this invention include: (Block 3A) providing a hierarchical multi-level decision tree structure comprised of internal nodes and leaf nodes, the decision tree structure representing a task; and (Block 3B) navigating, using information derived from detected mental states of a user, through levels of the decision tree structure to reach a leaf node to accomplish the task. The step of navigating comprises selecting, using the information derived from the detected mental states of the user, between attribute values associated with internal nodes of the decision tree structure.

The various blocks shown in FIG. 3 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations may become apparent to those skilled in the relevant arts in view of the foregoing description, when read in conjunction with the accompanying drawings and the appended claims. As but some examples, the use of other similar or equivalent techniques for detecting and decoding mental states of the user may be attempted by those skilled in the art.

Further, it should be appreciated that entropy based classification for the decision tree is but one suitable technique that may be employed.

Further still, it can be noted that the command/control task may be considered as a sequence of decisions to be made on a limited number of choices at any given time. As such, other suitable classification techniques may be used as well. Note also that the decision tree may be viewed as a dialogue task or structure of the application, for example the above-described name dialing application. At every level and branch of the tree there is at least one choice, and the total number of possible choices are generally but a few. To differentiate among these choices, any classification method that operates on raw or feature extracted signals can be applied. One non-limiting example is the hidden Markov model (HMM) which is known to be used in, for example, speech recognition systems and methods. In that the signals generated by the BCI 22 (e.g., the EEG signal) have a temporal nature, the HMM can be used with these signals. In this case the HMMs are trained for each node so as to make them identifiable for each lower level node.

Thus, it should be appreciated that the decision tree representation that has been described above and shown in FIG. 2 should be viewed as being one non-limiting example of a suitable representation of a multi-level, multi-node structure that is suitable for representing an application dialogue.

Figure 4:
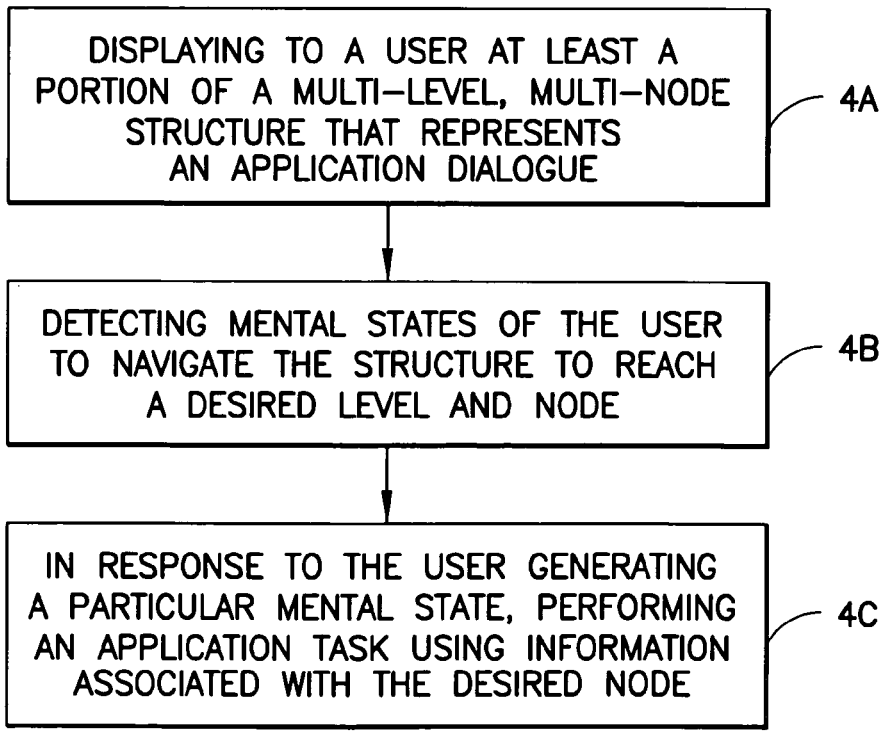
FIG. 4 is a logic flow diagram in accordance with a further method, and operation of a further computer program product, in accordance with exemplary embodiments of this invention.

Further by example, a more generic representation may be obtained if there were only three mental states to be differentiated, e.g., up, down and select (or left, right and select). In this case a linear (e.g., vertical) listing for up and down may be employed for presenting the user with a list of names. In this case the user's task is to generate mental states to browse the list (up and/or down) until the user locates a desired name. Once the desired name is located a "select" mental state is produced for causing the underlying application to take the appropriate action. One advantage of this technique is that only three distinct mental states need to be trained. Note that if a horizontal left-right navigation option is used (as opposed to the vertical up-down navigation option), then the structure may still be considered to comprise a plurality of levels (or layers) and nodes. As such, and referring to FIG. 4, it can be seen that the exemplary embodiments of this invention further provide for: (Block 4A) displaying to a user at least a portion of a multi-level, multi-node structure that represents an application dialogue; (Block 4B) detecting mental states of the user to navigate the structure to reach a desired level and node and, (Block 4C) in response to the user generating a particular mental state, performing an application task using information associated with the desired node.

It should also be noted that the display 20 of the user interface 18 need not display the entire decision tree structure.

Instead it may be displayed as, for example, a rolling type of presentation mode that is focused to a particular (current) level and perhaps also to one adjacent (e.g., lower) level. In this manner the user's attention can be drawn to only the current relevant options, and is not distracted by other displayed information.

However, all such and similar modifications of the teachings of this invention will still fall within the scope of this invention.

Furthermore, some of the features of the examples of this invention may be used to advantage without the corresponding use of other features. As such, the foregoing description should be considered as merely illustrative of the principles, teachings, examples and exemplary embodiments of this invention, and not in limitation thereof.

What is claimed is:

1. A method, comprising:
representing, in a memory of a mobile communications device having a physically constrained user interface, a plurality of contact tasks via a hierarchical multi-level decision tree structure comprised of a root node, a plurality of internal nodes and a plurality of leaf nodes in a hierarchical arrangement of parent nodes and child nodes under the root node, where each contact task comprises a contact command to be executed upon selection of a leaf node corresponding to the contact task, where the root node is designated as a contact list for a plurality of contacts, where each leaf node corresponds to contact information for one of the contacts;
receiving, by the mobile communications device, information derived from detected mental states of a user, where the received information is configured to enable traversal of the hierarchical multi-level decision tree structure from the root node to a particular leaf node by providing a selected child node for any parent node encountered that has a plurality of child nodes, where the particular leaf node corresponds to a particular contact for whom a particular contact task is to be performed;
navigating, by the mobile communications device and using the received information, through levels of the hierarchical multi-level decision tree structure to reach the particular leaf node; and
executing, by the mobile communications device, a particular contact command corresponding to the particular leaf node in order to accomplish the particular contact task.

2. The method of claim 1, where navigating comprises selecting, using the received information, between attribute values associated with the internal nodes of the decision tree structure.

3. The method of claim 2, where attributes associated with the internal nodes are trained based on at least one criterion.

4. The method of claim 3, where the at least one criterion comprises an entropy based information gain criterion.

5. The method of claim 1, where navigating comprises displaying a representation of the hierarchical multi-level decision tree structure to the user.

6. The method of claim 1, where the mobile communications device comprises means for detecting the mental states of the user.

7. The method of claim 1, where the mobile communications device is configured to receive input from a remotely located means for detecting the mental states of the user.

8. The method of claim 1, where the received information is obtained using electroencephalography (EEG).

9. The method of claim 1, where the contact information for the one of the contacts comprises a telephone number for the one of the contacts and the plurality of contact tasks comprises a plurality of telephone number dialing tasks.

10. The method of claim 1, where the contact information for the one of the contacts comprises an email address for the one of the contacts and the plurality of contact tasks comprise a plurality of email tasks.

11. A computer-readable storage medium storing program instructions that, when executed by a data processor of a mobile communications device having a physically constrained user interface, result in operations comprising:
representing a plurality of contact tasks via a hierarchical multi-level decision tree structure comprised of a root node, a plurality of internal nodes and a plurality of leaf nodes in a hierarchical arrangement of parent nodes and child nodes under the root node, where each contact task comprises a contact command to be executed upon selection of a leaf node corresponding to the contact task, where the root node is designated as a contact list for a plurality of contacts, where each leaf node corresponds to contact information for one of the contacts;
receiving information derived from detected mental states of a user, where the received information is configured to enable traversal of the hierarchical multi-level decision tree structure from the root node to a particular leaf node by providing a selected child node for any parent node encountered that has a plurality of child nodes, where the particular leaf node corresponds to a particular contact for whom a particular contact task is to be performed;
navigating, using the received information, through levels of the hierarchical multi-level decision tree structure to reach the particular leaf node; and
executing a particular contact command corresponding to the particular leaf node in order to accomplish the particular contact task.

12. The computer-readable storage medium of claim 11, where navigating comprises selecting, using the received information, between attribute values associated with the internal nodes of the decision tree structure.

13. The computer-readable storage medium of claim 12, where attributes associated with the internal nodes are trained based on at least one criterion.

14. The computer-readable storage medium of claim 13, where the at least one criterion comprises an entropy based information gain criterion.

15. The computer-readable storage medium of claim 11, where the operation of navigating comprises displaying a representation of the hierarchical multi-level decision tree structure to the user.

16. The computer-readable storage medium of claim 11, where the mobile communications device comprises means for detecting the mental states of the user.

17. The computer-readable storage medium of claim 11, where the mobile communications device is configured to receive input from a remotely located means for detecting the mental states of the user.

18. The computer-readable storage medium of claim 11, where the received information is obtained using electroencephalography (EEG).

19. The computer-readable storage medium of claim 11, where the contact information for the one of the contacts comprises a telephone number for the one of the contacts and the plurality of contact tasks comprises a plurality of telephone number dialing tasks.

20. The computer-readable storage medium of claim 11, where the contact information for the one of the contacts comprises an email address for the one of the contacts and the plurality of contact tasks comprise a plurality of email tasks.

21. An apparatus comprising:
a data processor; and
a memory including computer program code, where the apparatus comprises a mobile communications device having a physically constrained user interface, the memory and the computer program code being configured to, with the data processor, cause the apparatus at least to perform:
representing, in the memory of the apparatus, a plurality of contact tasks via a hierarchical multi-level decision tree structure comprised of a root node, a plurality of internal nodes and a plurality of leaf nodes in a hierarchical arrangement of parent nodes and child nodes under the root node, where each contact task comprises a contact command to be executed upon selection of a leaf node corresponding to the contact task, where the root node is designated as a contact list for a plurality of contacts, where each leaf node corresponds to contact information for one of the contacts;
receiving information derived from detected mental states of a user, where the received information is configured to enable traversal of the hierarchical multi-level decision tree structure from the root node to a particular leaf node by providing a selected child node for any parent node encountered that has a plurality of child nodes, where the particular leaf node corresponds to a particular contact for whom a particular contact task is to be performed;
using the received information to navigate through levels of the hierarchical multi-level decision tree structure to reach the particular leaf node; and
executing a particular contact command corresponding to the particular leaf node in order to accomplish the particular contact task.

22. The apparatus of claim 21, further comprising a user interface configured to enable the user to select, using the received information, between attribute values associated with the internal nodes of the decision tree structure.

23. The apparatus of claim 22, where attributes associated with the internal nodes are trained by said data processor in cooperation with said user interface based on at least one criterion.

24. The apparatus of claim 23, where the at least one criterion comprises an entropy based information gain criterion.

25. The apparatus of claim 21, further comprising a user interface configured to display a representation of the hierarchical multi-level decision tree structure to the user.

26. The apparatus of claim 21, further comprising means for detecting the mental states of the user.

27. The apparatus of claim 21, further comprising an interface configured to receive input from a remotely located means for detecting the mental states of the user.

28. The apparatus of claim 21, where the received information is obtained using electroencephalography (EEG).

29. The apparatus of claim 21, where the contact information for the one of the contacts comprises a telephone number for the one of the contacts and the plurality of contact tasks comprises a plurality of telephone number dialing tasks.

30. The apparatus of claim 21, where the contact information for the one of the contacts comprises an email address for the one of the contacts and the plurality of contact tasks comprise a plurality of email tasks.

31. An apparatus, comprising:
means for representing a plurality of contact tasks via a hierarchical multi-level decision tree structure comprised of a root node, a plurality of internal nodes and a plurality of leaf nodes in a hierarchical arrangement of parent nodes and child nodes under the root node, where each contact task comprises a contact command to be executed upon selection of a leaf node corresponding to the contact task, where the root node is designated as a contact list for a plurality of contacts, where each leaf node corresponds to contact information for one of the contacts, where the apparatus comprises a mobile communications device having a physically constrained user interface;

means for receiving information derived from detected mental states of a user, where the received information is configured to enable traversal of the hierarchical multi-level decision tree structure from the root node to a particular leaf node by providing a selected child node for any parent node encountered that has a plurality of child nodes, where the particular leaf node corresponds to a particular contact for whom a particular contact task is to be performed;

means, responsive to the received information, for navigating through the levels of the hierarchical multi-level decision tree structure to reach the particular leaf node; and means for executing a particular contact command corresponding to the particular leaf node in order to accomplish the particular contact task.

32. The apparatus of claim 31, further comprising means for enabling the user to select, using the received information, between attribute values associated with the internal nodes of the decision tree structure.

33. The apparatus of claim 31, further comprising means for training attributes associated with nodes of the decision tree structure.

34. The apparatus of claim 31, further comprising means for detecting the mental states of the user.

35. The apparatus of claim 31, further comprising means for receiving input from a remotely located means for detecting the mental states of the user.

36. The apparatus of claim 31, where the received information comprises information obtained by electroencephalography (EEG).

37. The apparatus as in claim 31, where the particular contact task comprises establishing a communication with the particular contact selected by the user via said apparatus.

38. A method, comprising:
representing, in a memory of a mobile communications device having a physically constrained user interface, a plurality of contact application tasks via a multi-level, multi-node structure comprising a plurality of leaf nodes, where each contact application task comprises a contact command to be executed upon selection of a leaf node corresponding to the contact application task, where the root node is designated as a contact list for a plurality of contacts, where each leaf node corresponds to contact information for one of the contacts;

displaying to a user, on a display of the apparatus, at least a portion of the multi-level, multi-node structure that represents an application dialogue;

receiving, by the apparatus, information derived from detected mental states of the user, where the received information is configured to enable traversal of the multi-level, multi-node structure to reach at least one of a particular level and a particular leaf node, where the particular leaf node corresponds to a particular contact for whom a particular contact task is to be performed;

navigating, by the apparatus and using the received information, through the multi-level, multi-node structure to reach the at least one of a particular level and a particular leaf node; and in response to the user generating a particular mental state, performing a particular contact application task using particular contact information associated with the particular leaf node.

39. The method of claim 38, further comprising training the multi-level, multi-node structure using an entropy-based technique.

40. The method of claim 38, further comprising training the multi-level, multi-node structure using a hidden Markov model technique.

* * * * *